(12) United States Patent
Chen et al.

(10) Patent No.: US 9,026,400 B2
(45) Date of Patent: *May 5, 2015

(54) DIAGNOSTIC PROCESS FOR HOME ELECTRONIC DEVICES

(75) Inventors: Ieon C. Chen, Laguna Hills, CA (US);
Robert Madison, Eastvale, CA (US);
Keith Andreasen, Garden Grove, CA (US)

(73) Assignee: Innova Electonics, Inc., Irvine, CA (US)

( * ) Notice: Subject to any disclaimer, the term of this patent is extended or adjusted under 35 U.S.C. 154(b) by 447 days.

This patent is subject to a terminal disclaimer.

(21) Appl. No.: 13/461,368

(22) Filed: May 1, 2012

(65) Prior Publication Data

US 2012/0215398 A1    Aug. 23, 2012

Related U.S. Application Data

(63) Continuation-in-part of application No. 11/823,757, filed on Jun. 28, 2007, now Pat. No. 8,019,503, and a continuation-in-part of application No. 12/715,181, filed on Mar. 1, 2010, now Pat. No. 8,370,018.

(51) Int. Cl.
| G06F 19/00 | (2011.01) |
|---|---|
| G06F 17/00 | (2006.01) |
| G06Q 10/00 | (2012.01) |
| G06Q 50/30 | (2012.01) |
| G07C 5/00 | (2006.01) |
| G07C 5/08 | (2006.01) |

(52) U.S. Cl.
CPC ............... *G06F 17/00* (2013.01); *G06Q 10/20* (2013.01); *G06Q 50/30* (2013.01); *G07C 5/008* (2013.01); *G07C 5/0808* (2013.01)

(58) Field of Classification Search
CPC .. G07C 5/008; G07C 5/0808; G07C 2205/02; G06Q 50/30; G06Q 10/20; G06F 17/00
USPC ........... 702/119, 123, 182, 183, 59; 701/29.6, 701/31.6, 33
See application file for complete search history.

(56) References Cited

U.S. PATENT DOCUMENTS

| D334,560 S | 4/1993 | Wilson |
|---|---|---|
| 5,347,211 A | 9/1994 | Jakubowski |
| D377,622 S | 1/1997 | Chen |
| 5,635,841 A | 6/1997 | Taylor |
| 5,767,681 A | 6/1998 | Huang |

(Continued)

*Primary Examiner* — John H Le
(74) *Attorney, Agent, or Firm* — Stetina Brunda Garred & Brucker

(57) ABSTRACT

A method of processing system diagnostic data is provided for identifying likely device fix(s) associated with a diagnostic data, and identifying a repair procedure(s) for correcting the likely fix(s). The process receiving diagnostic data from a system onboard computer at a remote diagnostic database, the database being arranged to map system diagnostic data to possible vehicle fix(s). The possible device fix(s) are prioritized in accordance with ranked matches of the received diagnostic data to combinations of diagnostic data stored in a prior experience database. The prior experience database having an identified fix associated with each stored combination of diagnostic data. The fix associated with the highest ranked combination of diagnostic data is identified as the most likely fix. The most likely fix is mapped to a system repair database, the most likely fix being directly mapped to an associated repair procedure for repairing the most likely fix.

12 Claims, 4 Drawing Sheets

(56) References Cited

U.S. PATENT DOCUMENTS

| | | |
|---|---|---|
| 6,000,413 A | 12/1999 | Chen |
| 6,499,385 B2 | 12/2002 | Protti |
| 6,687,584 B2 | 2/2004 | Andreasen |
| 6,868,369 B2 | 3/2005 | Huang |
| 6,940,270 B2 | 9/2005 | Chen |
| 6,941,203 B2 | 9/2005 | Chen |
| 6,947,816 B2 | 9/2005 | Chen |
| D510,287 S | 10/2005 | Chen |
| 6,968,733 B2 | 11/2005 | Andreasen |
| 7,030,742 B2 | 4/2006 | Treadway |
| 7,085,680 B2 | 8/2006 | Huang |
| 7,116,216 B2 | 10/2006 | Andreasen |
| 7,209,813 B2 | 4/2007 | Namaky |
| RE39,619 E | 5/2007 | Andreasen |
| D545,223 S | 6/2007 | Chen |
| D558,621 S | 1/2008 | Rich |
| D559,137 S | 1/2008 | Protti |
| D560,129 S | 1/2008 | Rich |
| D560,527 S | 1/2008 | Rich |
| 7,325,775 B2 | 2/2008 | Chen |
| D563,249 S | 3/2008 | Chen |
| D569,280 S | 5/2008 | Chen |
| 7,376,497 B2 | 5/2008 | Chen |
| D571,241 S | 6/2008 | Andreasen |
| 7,437,227 B2 | 10/2008 | Andreasen |
| D581,822 S | 12/2008 | Madison |
| 7,464,000 B2 | 12/2008 | Huang |
| D590,387 S | 4/2009 | Chen |
| 7,520,668 B2 | 4/2009 | Chen |
| RE40,798 E | 6/2009 | Chen |
| RE40,799 E | 6/2009 | Chen |
| 7,603,293 B2 | 10/2009 | Chen |
| D610,586 S | 2/2010 | Chen |
| 7,734,390 B2 | 6/2010 | Chen |
| D624,446 S | 9/2010 | Chen |
| D624,838 S | 10/2010 | Chen |
| D625,209 S | 10/2010 | Chen |
| D625,210 S | 10/2010 | Chen |
| D625,634 S | 10/2010 | Chen |
| 8,019,503 B2 | 9/2011 | Andreasen |
| 8,024,083 B2 | 9/2011 | Chen |
| D646,188 S | 10/2011 | Chen |
| D646,599 S | 10/2011 | Chen |
| 8,032,419 B2 | 10/2011 | Chen |
| 8,068,951 B2 | 11/2011 | Chen et al. |
| 8,370,018 B2 * | 2/2013 | Andreasen et al. .......... 701/31.6 |
| 2002/0007237 A1 * | 1/2002 | Phung et al. .................... 701/33 |
| 2008/0004764 A1 | 1/2008 | Chinnadurai |
| 2008/0119981 A1 | 5/2008 | Chen |
| 2009/0276115 A1 | 11/2009 | Chen |
| 2009/0326757 A1 | 12/2009 | Andreasen |
| 2010/0174446 A1 | 7/2010 | Andreasen |
| 2011/0112932 A1 | 5/2011 | Chen |
| 2011/0224866 A1 | 9/2011 | Chen |
| 2011/0264322 A1 | 10/2011 | Chen |
| 2012/0010775 A1 | 1/2012 | Chen |

* cited by examiner

DIAGNOSTIC PROCESS FOR HOME ELECTRONIC DEVICES

CROSS-REFERENCE TO RELATED APPLICATIONS

This application is a continuation-in-part of application Ser. No. 12/715,181 filed on Mar. 1, 2010, which is a continuation-in-part of application Ser. No. 11/823,757 filed on Jun. 28, 2007, both of which are incorporated herein by reference.

STATEMENT RE: FEDERALLY SPONSORED RESEARCH/DEVELOPMENT

Not Applicable

BACKGROUND

The present invention relates to diagnostic processes and systems for analyzing diagnostic information received from a defective home electronic device, and identifying the most likely repair(s) that will correct the defective condition.

Home electronic devices have become more prolific and more complicated in recent years. Such devices include, but are not limited to televisions, DVD players, audio systems, phone systems, telephones, vacuum cleaners, HVAC systems, computers, computer peripherals, health and exercise equipment, musical instruments, and a wide range of appliances. In some cases home electronic systems are relatively inexpensive, encouraging replacement of such defective devices rather than diagnosing and repairing the defect. However, in other cases the cost of the device is significantly greater and/or replacement of the device may be cumbersome, making diagnosis and repair more desirable.

Other factors influencing the response to defects in home electronic devices include the sophistication of the devices and the reliability of any diagnosis of the defective condition. As the home electronic devices become more and more sophisticated, the ability to monitor circuits and mechanisms within the device generally improves, and user interfaces may allow easier access to such diagnostic information. The availability of such additional information, in the hands of qualified technician, can enhance the reliability of the diagnostic analysis, reduce the time necessary for such analysis, and mitigate the likelihood of exploratory repairs which may be unnecessary and add to the repair cost.

However, despite the growing sophistication of home electronic devices, dedicated diagnostic products and processes have lagged behind the evolution of diagnostic products used in other fields, such as automotive diagnostic products. To some extent this may be due to a lack of standardization of diagnostic information available from home electronic systems, in relation to the growing standardization of information from vehicular electronic systems. Nonetheless, despite such standardization of communication protocols, diagnostic trouble codes or monitor identifiers, some of the same analytical techniques may be applicable and highly user to achieve more efficient and less costly repairs of home electronic devices. Once such analytical technique is disclosed in U.S. patent application Ser. No. 11/823,757, now U.S. Pat. No. 8,068,951, which is owned by the owner of the present application. That patent discloses a method of comparing sets of diagnostic trouble codes (DTCs) to stored sets of trouble codes in a database, wherein the stored sets trouble codes are associated with diagnostic solutions. The possible diagnostic solutions are thus prioritized in accordance with ranked matches of the combined sets of received DTCs to the sets of DTCs stored in the prior experience database, with the possible diagnostic solution associated with the highest ranked stored sets of DTCs being indentified as the most likely solution. Once the most likely solution is identified, then the system can proceed to perform additional functions, such as reviewing related diagnostic data useful to confirm the most likely solution and/or accessing repair procedures corresponding to the most likely solution.

Where a most likely solution is identified, the cost of any needed replacement parts and the cost of the repairs procedure can then be more reliably estimated, and the homeowner/consumer is better positioned to evaluate whether to repair or replace the device.

Where such identification of the most likely solution can be readily identified by a technician or consumer, the cost for the diagnosis can be reduced and the consumer can be more confident in the accuracy of the diagnosis. As described below, the present invention allows use of such enhanced diagnostic techniques for home electronic devices having compatible control systems and diagnostic interfaces.

BRIEF SUMMARY

A method of processing diagnostic data from a defective home electronic device is provided for identifying likely fix(s) associated with a diagnostic data, and identifying a repair procedure(s) for correcting the likely fix(s). The process includes communicating diagnostic data from a computer disposed within the system to a remote diagnostic database, the database being arranged to map diagnostic data to possible fix(s). The possible fix(s) are prioritized in accordance with ranked matches of the received diagnostic data to combinations of diagnostic data stored in a prior experience database. The prior experience database having at least one identified fix associated with each stored combination of diagnostic data. The fix(s) associated with the highest ranked combination of diagnostic data is identified as the most likely fix(s).

The most likely fix may be mapped to a repair database. More particularly, the most likely fix may be directly mapped to a specified repair procedure for implementing the most likely fix.

In one embodiment the step of prioritizing possible fix(s) comprises comparing combinations of diagnostic trouble codes received from the system computer to stored combinations of diagnostic trouble codes in the prior experience database. The stored combination of diagnostic trouble codes ranked highest in relation to the diagnostic trouble codes received from the system computer is thereby identified. The fix associated with the highest ranked stored combination of diagnostic trouble codes is identified as the most likely fix.

The step of prioritizing possible fix(s) may be implemented based on prioritization rules, such as identifying the stored combination of digital trouble codes which include each of the diagnostic trouble codes received from the system computer, with a minimum of additional diagnostic trouble codes.

Prioritization steps may also include identifying stored combinations of digital trouble codes, and associated fix(s), having the highest successful fix count. Additional prioritization rules may include prioritization of stored combinations of diagnostic trouble codes in accordance with the cost of repair of the associated fix.

In one embodiment, the method further includes accessing a repair procedures database for repairing a range of defective conditions, and linking the most likely fix to a selected repair procedure(s) in the repair procedures database, the selected repair procedure(s) being effective to repair the most likely fix. The selected repair procedure is then accessed.

The diagnostic data, along with system identifying information may be processed within the scan tool and/or may be wirelessly uploaded from a hand held scan tool to a personal computer, cell phone or a wireless communication device adapted to access the remote diagnostic database via the World Wide Web.

In one embodiment the communication path between the scan tool and the communication device may also be implemented wirelessly, e.g. via a Bluetooth™ local communication system or the equivalent.

Similarly, the communication path between the scan tool and the device electronic control unit may be wireless, e.g. implemented using a wireless local communication, such as Bluetooth™ communication device.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The description below is given by way of example, and not limitation. Given the disclosure set forth herein, one skilled in the art could devise variations that are within the scope and spirit of the disclosed invention. Further, it is to be understood that the various features of the embodiments disclosed herein can be used alone, or in varying combinations with each other and are not intended to be limited to the specific combination described herein. Thus, the scope of the claims is not to be limited by the illustrated embodiments.

Figure 1:
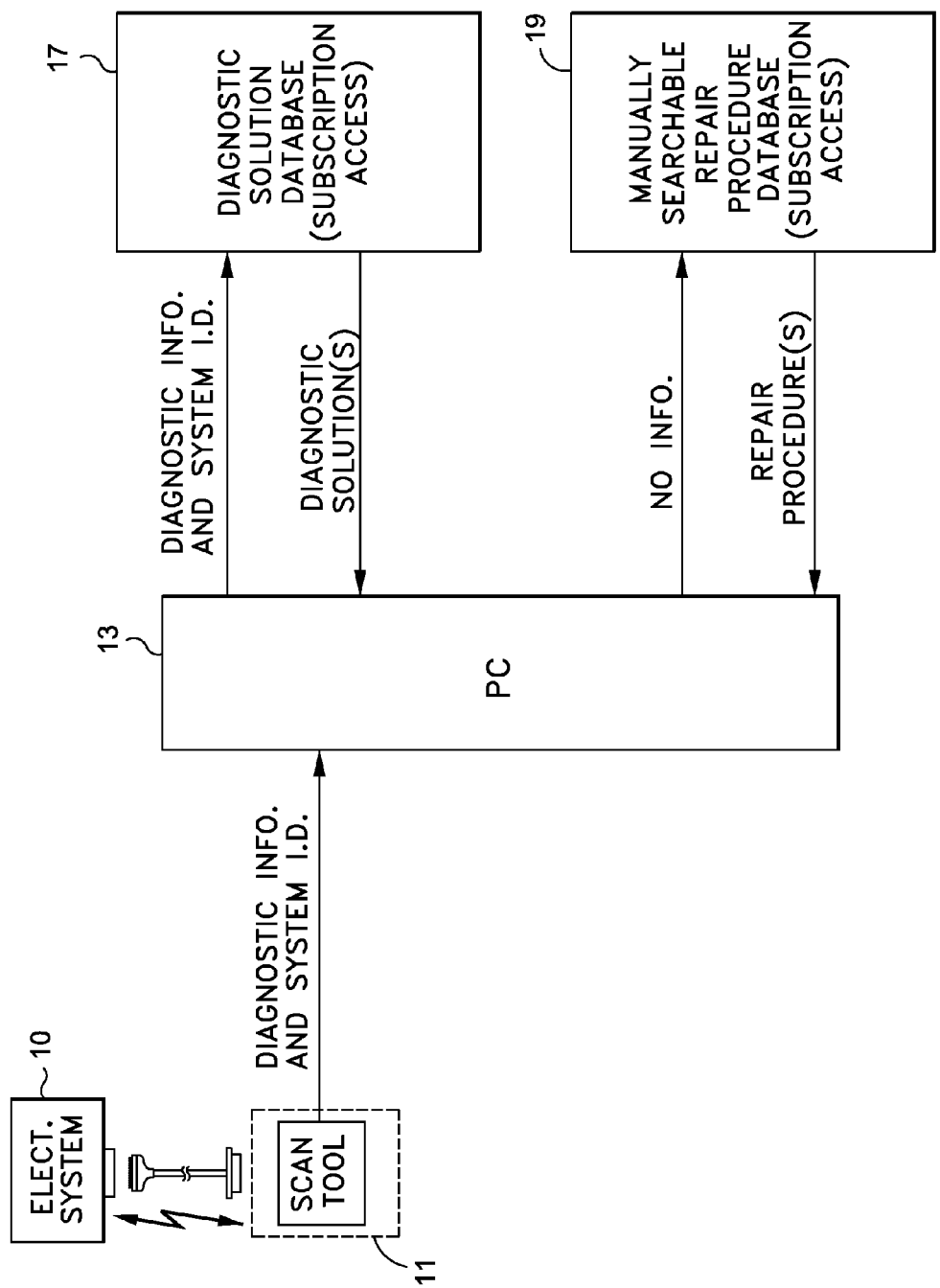
FIG. 1 is a block diagram illustrating the operation of prior art diagnostic procedures.

FIG. 1 illustrates a prior art technique for evaluating diagnostic information, and for identifying potential repair procedures for automotive electrical devices. In accordance with such techniques, hand held code reader or scan tool 11 is engaged to a diagnostic port of electrical system 10, such as the diagnostic port of a vehicle electronic control unit (ECU). The scan tool receives diagnostic information, such as DTC's, status information, etc. Depending upon the particular system (or vehicle), the diagnostic information may be accompanied by identification information, such as the year/make/model of the vehicle or the other electrical system. That information may be communicated to a personal computer 13, where it can be displayed and further processed.

Diagnostic solution database 17 may be separate from the personal computer, PC 13, or may reside within PC 13. Where the diagnostic solution database 17 is separate, it may be remotely connected to PC 13, via the World Wide Web or other communication means. Access to the diagnostic solution database 17 may be freely available to all users, or may be restricted in use, e.g., accessible on a paid subscription basis, or limited to compatibility only with specific scan tools.

In response to receipt of diagnostic information from PC 13, the diagnostic solution database provides information directly associated with the diagnostic trouble code or other information. That information would typically include information describing the substance of the diagnostic information that conforms to a specific DTC, e.g., a DTC descriptor. In some cases, database 17 would also provide some information regarding a possible diagnostic solution, or fix. Each fix is directly associated with a corresponding diagnostic trouble code. Such fixes, or diagnostic solutions, may be communicated to PC 13 where they can be viewed by a user.

A repair procedure for implementing each fix identified by database 17 may be identified by searching repair procedure database 19. Database 19 may be a freely accessible database, or a database restricted to subscription access. In practice, a user accesses the repair procedure database 19, typically through a main page and index, which is used to search for the appropriate procedure(s) associated with repairing each fix identified by database 17. The user would therefore look at the identified fix, and then visually locate the repair procedure associated with that fix. Where multiple DTC's are identified by the diagnostic information from system 10, the process result in a laborious back and forth, looking at the fixes identified by the diagnostic solution database 17, and locating the associated repair procedure in repair procedure database 19. Diagnostic solution database 17 is typically not operative to identify a fix associated with multiple digital trouble codes, or to prioritize possible fixes that could arise in relation to various combinations of digital trouble codes. As such, the fix identified by database 17 may address only a symptom associated with a DTC, rather than the underlying cause. In such cases, endeavoring to implement multiple repair procedures, each associated with each an DTC, may be little more than an exercise in futility as the DTC may return in short order after the repair is complete.

Figure 2:
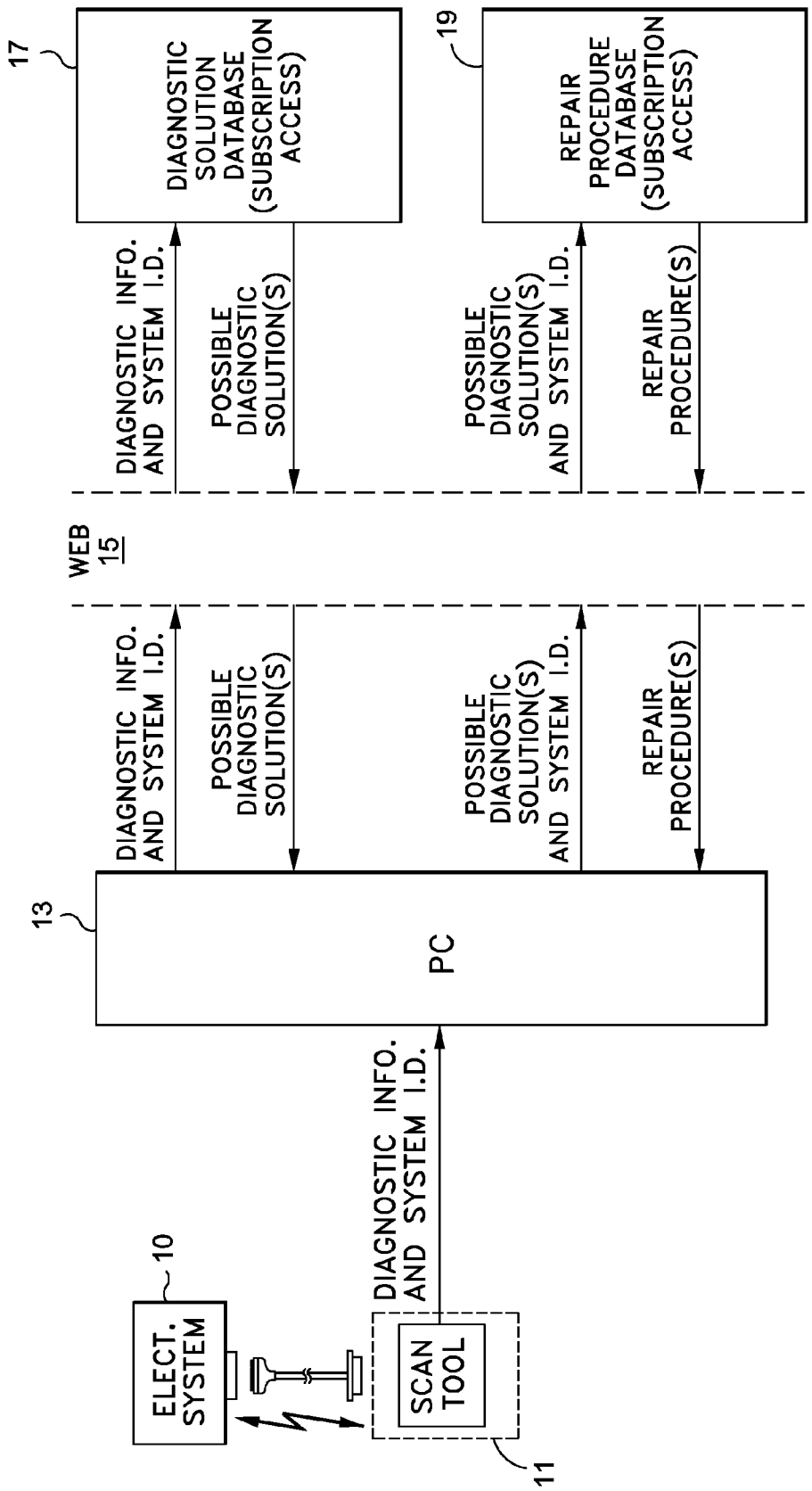
FIG. 2 is another block diagram illustrating the operation of prior art diagnostic procedures.

FIG. 2 illustrates an alternate prior art configuration wherein the diagnostic subscription database 17 and the repair procedure database 19 are accessible to PC 13 via the World Wide Web 15. Again, diagnostic information is communicated to diagnostic subscription database 17 and possible diagnostic fixes, or solutions, may be individually derived for each DTC and communicated to PC 13. Each possible diagnostic solution may be communicated to the repair procedure database 19, where it can be separately mapped to a corresponding repair procedure, as previously desembed. The identified repair procedure can then be communicated to the user at PC 13.

As with the procedure described in relation to FIG. 1, the procedure described in relation to FIG. 2 does not provide for fixes or diagnostic solutions associated with combinations of DTC's or other diagnostic information. As such, the diagnostic solutions are most useful in accessing repair procedures associated with clear and unambiguous diagnostic information. The procedure is, therefore, of limited value in relation to more ambiguous diagnostic information, i.e., DTC's that could arise in relation to more than one diagnostic condition, and could be repaired by more than one repair procedure. The procedure may, therefore, also be of marginal use to users having little system repair background, who typically need a clear indication of the fix to be repaired. Users having a more significant system repair background may find information from to the databases useful as resources, but may find the process inefficient and unreliable in relation to defects associated with combinations of DTC's.

Figure 3:
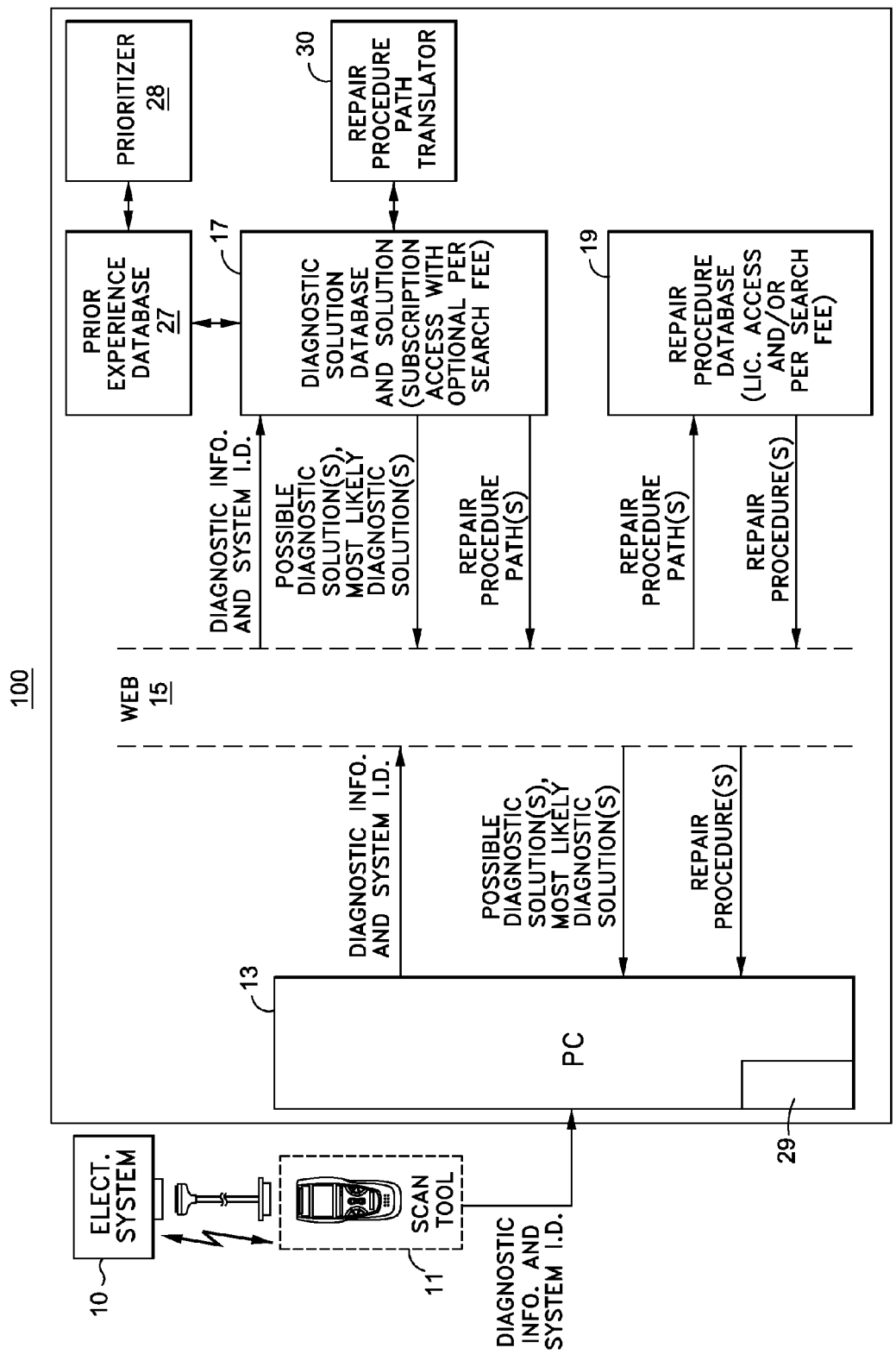
FIG. 3 illustrates one embodiment of a diagnostic process and system, in accordance with the present invention.

FIG. 3 illustrates a process and configuration in accordance with one aspect of the present invention. As discussed in relation to the preceding figures, diagnostic information from electrical system 10 may be uploaded to scan tool 11, to be communicated to PC 13, which may be implemented as a personal computer that functions independent of the system 10, or a vehicle onboard communication device adapted to wirelessly access the diagnostic database 17 via the World Wide Web. As referenced herein, the scan tool 11 is understood to be independent of a diagnostic assessment system 100, which may be include the PC 13 and the diagnostic database 17. Such communication from the scan tool 11 may be facilitated by direct wire connection of the scan tool 11 to the PC 13, or by wireless connection from system 10 to scan tool 11, or to PC 13. In one embodiment a wireless connection path is formed from the scan tool 11 to the World Wide Web, via a cell phone. Such a system design is described in U.S. patent application Ser. No. 11/172,293 for Cell Phone Based Vehicle Diagnostic System, assigned to the common assignee, the contents of which are incorporated herein by reference. In another embodiment the scan tool 11 or onboard computer may communicate diagnostic information to an onboard communication device adapted to access the World Wide Web via a user interface integrated into a display screen integrated into the system 10. The diagnostic information, which may also include system identifying information (e.g. make, model, serial number, etc.), may in turn be communicated to a remote diagnostic solution database 21 via the World Wide Web 15. The diagnostic solution database 21 can operate to translate DTC's to descriptors, and can also define a repair path to a particular location in repair procedure database 19, wherein an associated repair procedure is described.

Where the diagnostic information includes combinations of digital trouble codes and/or other diagnostic data, a prior experience database, such as prior experience database 27, can be accessed to identify similar stored combinations of diagnostic trouble codes, along with associated information, such as the fix(es) associated with such combination of DTC's, the successful diagnosis count associated with each such fix and the cost associated with each such fix. As explained more fully below, the information from the prior experience database is prioritized by the fix prioritizer 20 in accordance with prioritization rules described below. In general, the fix prioritization rules evaluate facts such as whether the stored combinations of DTC's include the same DTC's received from the system 10; whether the stored combinations of DTC's include additional DTC's, other than DTC's from the system 10; the successful diagnosis or fix rate associated with each stored combination of DTC's and the associated fix. Evaluation of such factors, in accordance with the scenarios set forth below, allows the identification of a most likely fix associated with the received DTC's and system identifying information.

In the embodiment illustrated at FIG. 3, the diagnostic solution database 21 is connected to repair procedure path translator 30 wherein the most likely fix, as determined by prioritizer 28, is parsed or otherwise mapped to a specific portion of repair procedure database 19, which defines the procedure for implementing repair of the most likely fix. The repair procedure path is communicated to repair procedure database 19, via the world wide web 15, to allow a user to access the repair procedure(s) found to be most appropriate to correct the defects associated with the diagnostic information output from system 10. Information identifying the particular system (e.g. make, model, serial number, etc.) may also be communicated to the repair procedure database 19 to facilitate mapping at the repair procedure database 19, or may be factored into the repair procedure path identified by repair procedure path translator 30.

Figure 4:
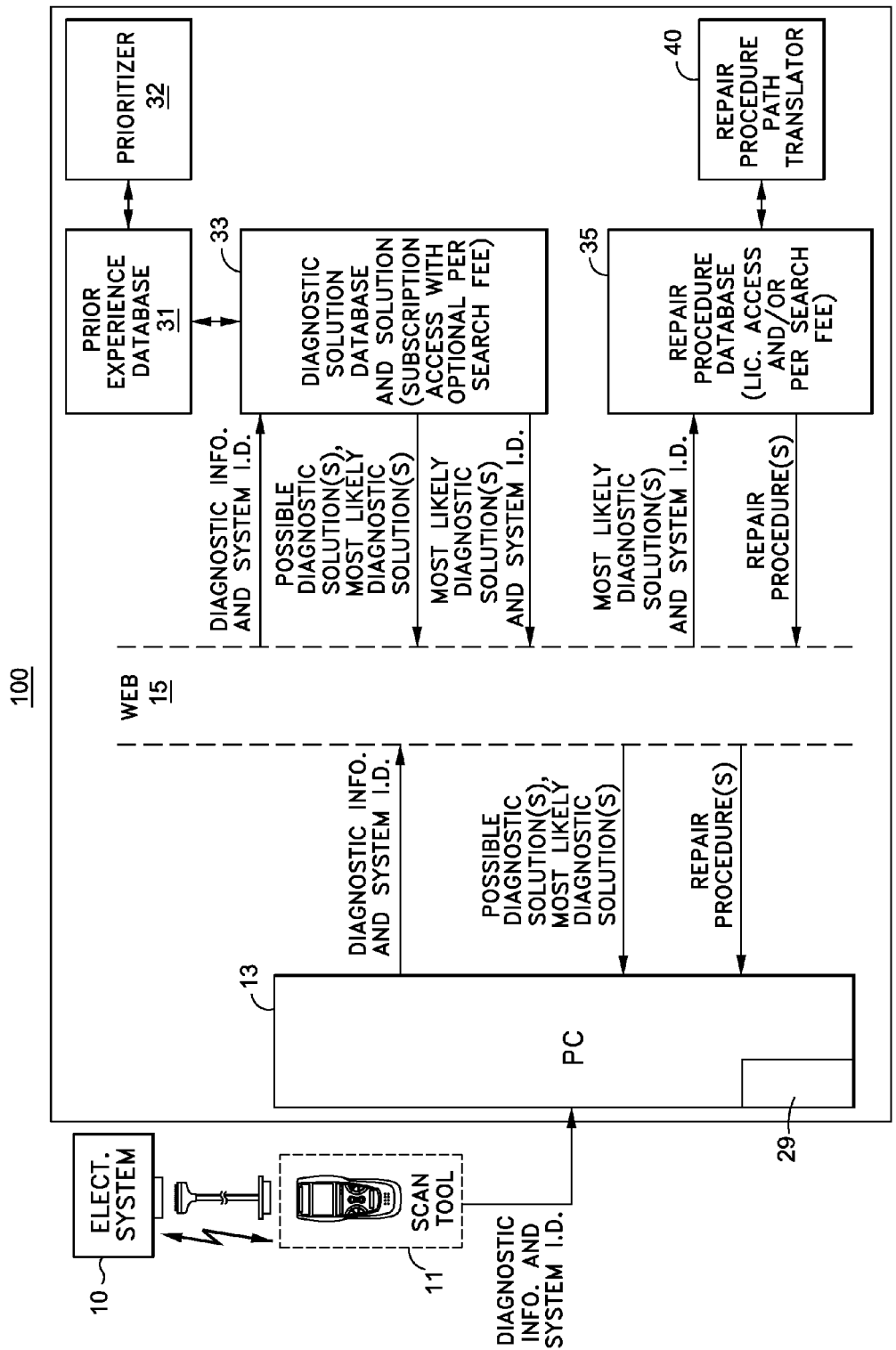
FIG. 4 illustrates a second embodiment of a diagnostic process and system, in accordance with the present invention.

FIG. 4 illustrates an alternate implementation of the present invention. The primary distinction in relation to the implementation shown in FIG. 4 concerns the location wherein the repair procedure path is defined. In the embodiment of FIG. 4, the prioritizer 32, in cooperation with prior experience database 31, outputs the most likely fix, which is not mapped to a repair procedure path at database 35. Instead, repair procedure path translator 40 operates to map the most likely diagnostic fix(s) to a repair procedure path within repair procedure database 35. In such a way, definition of the appropriate repair procedure path may be affected by administrators of the repair procedure database, who are likely to have greater hands on knowledge of the repair procedure database, and its periodic updates. In practice, information communicated from the diagnostic solution database 33 to the repair procedure database 35 may, therefore, include device identifying information, to facilitate mapping to the appropriate repair procedure in database 35.

Commercial operation of the present invention may incorporate various types of business features, allowing use of the present invention by multiple types of users, on differing terms. In one such implementation PC 13 may be implemented as a kiosk allowing users to input information from a scan tool into the kiosk, whereupon it is communicated to the databases and operated on as described above. The kiosk may additionally incorporate an e-commerce terminal for effecting payment for different features. Those features may include loaning a compatible scan tool for use in accessing diagnostic information from the system 10 and communicating that information to compatible input ports in the kiosk. The e-commerce portal 29 may also facilitate access to the diagnostic solution database 21, either on a subscription basis or on a per search fee. A user, operating via a kiosk, a home personal computer, or some other communication mechanism, and therefore pay a fee to obtain information from the diagnostic solution database, e.g., possible fix and/or or the most likely fix(s). For an additional fee a user may further obtain access, on a per use basis, to the repair procedure(s) associated with the possible fix and/or the most likely fix(s).

Set forth below are tables representing scenarios 1-11 illustrating the manner in which possible diagnostic solutions, or fixes, are prioritized in accordance with one embodiment of the present invention. As described below, the present invention operates to prioritizing, or ranking, fixes in accordance with multiple factors. Those factors may include correspondence to the specific stored DTC's, the absence of additional, non-conforming DTC's, the successful fix count associated with each potential fix, and the cost associated with each fix. The weight given to those factors is described below in relation to the various scenarios.

Scenario 1 illustrates a simple scenario wherein a single primary code, and no secondary code output from the vehicle onboard computer, and the experience database identifies only one fix associated with that DTC. That fix, i.e., Fix 1, is therefore identified as the most likely fix to repair the defect condition associated with the identified DTC.

| Scenario 1 | | | | | |
|---|---|---|---|---|---|
| | Fix 1 | Fix 2 | Fix 3 | Fix 4 | Fix 5 |
| P.C. | P0101 | P0101 | | | |
| S.C.(s) | | | | | |
| Count: | | | | | |
| Fix Probability: | | 1 | | | |

Scenario 2 differs in that experience database identifies three different fixes associated with the same DTC. However, each fix has a different successful fix count associated therewith. Under such circumstances the fix having the highest success count is identified as the most likely fix, i.e., Fix 1.

| Scenario 2 | | | | | |
|---|---|---|---|---|---|
| | Fix 1 | Fix 2 | Fix 3 | Fix 4 | Fix 5 |
| P.C. | P0101 | P0101 | P0101 | P0101 | |
| S.C.(s) | | | | | |
| Count: | | 100 | 1 | 30 | |
| Fix Probability: | | 1 | 3 | 2 | |

Scenario 3 illustrates a condition wherein two DTC's are identified and three fixes are associated with the same two DTC's. A fourth fix is identified with one of the two DTC's, and has a higher successful fix count. Under this situation the most likely fix is identified as the fix having the highest success count of the two fixes conforming to both DTC's, i.e., Fix 2.

| Scenario 3 | | | | | |
|---|---|---|---|---|---|
| | Fix 1 | Fix 2 | Fix 3 | Fix 4 | Fix 5 |
| P.C. | P0101 | P0101 | P0101 | P0101 | P0101 |
| S.C.(s) | P0102 | P0102 | P0102 | P0102 | |
| Count: | | 3 | 20 | 10 | 100 |
| Fix Probability: | | 3 | 1 | 2 | 4 |

Scenario 4 presents a situation where no fix is identified which conforms to all four DTC's output from the system onboard computer. Two possible fixes each conform to the same number of DTC's, though one has a higher successful fix count. Under those circumstances, the most likely fix is identified as the fix having the highest count, i.e., Fix 2.

| Scenario 4 | | | | | |
|---|---|---|---|---|---|
| | Fix 1 | Fix 2 | Fix 3 | Fix 4 | Fix 5 |
| P.C. | P0101 | P0101 | P0101 | | |
| S.C.(S) | P0102 | P0102 | P0102 | | |
| | P0103 | | | | |
| | P0104 | | | | |
| Count: | | 3 | 20 | | |
| Fix Probability: | | 2 | 1 | | |

Scenario 5 presents a situation where again no fix conforms to each of the DTC's output from the system onboard computer. The fix conforming to the greatest number of conforming DTC's is selected as the most likely fix, despite the fact that another fix has a higher successful fix count, i.e., Fix 1.

| Scenario 5 | | | | | |
|---|---|---|---|---|---|
| | Fix 1 | Fix 2 | Fix 3 | Fix 4 | Fix 5 |
| P.C. | P0101 | P0101 | P0101 | | |
| S.C.(S) | P0102 | P0102 | P0102 | | |
| | P0103 | P0103 | | | |
| | P0104 | | | | |
| Count: | | 3 | 20 | | |
| Fix Probability: | | 1 | 2 | | |

Scenario 6 presents a situation where one possible fix conforms to each of the DTC's output from the system onboard computer, though the other possible fix has a much higher successful fix count. Again, the most likely fix is identified as that which conforms to each of the DTC's generated by the onboard computer, notwithstanding the lower fix count, i.e., Fix 1.

| Scenario 6 | | | | | |
|---|---|---|---|---|---|
| | Fix 1 | Fix 2 | Fix 3 | Fix 4 | Fix 5 |
| P.C. | P0101 | P0101 | P0101 | | |
| S.C.(S) | P0102 | P0102 | P0102 | | |
| | P0103 | P0103 | P0103 | | |
| | P0104 | P0104 | | | |
| Count: | | 1 | 100 | | |
| Fix Probability: | | 1 | 2 | | |

Scenario 7 presents a situation where both possible fixes include the single DTC generated by the system onboard computer. However, one fix also includes additional DTC's which are not output by the vehicle onboard computer. Under those circumstances the highest probability fix is identified as that which conforms most closely to the DTC output from the system onboard computer, without additional DTC's, i.e., Fix 2. This is notwithstanding the higher successful diagnosis count of the fix associated with the additional DTC's.

| Scenario 7 | | | | | |
|---|---|---|---|---|---|
| | Fix 1 | Fix 2 | Fix 3 | Fix 4 | Fix 5 |
| P.C. | P0101 | P0101 | P0101 | | |
| S.C.(S) | | P0102 | | | |
| | | P0103 | | | |
| | | P0104 | | | |
| Count: | | 1000 | 1 | | |
| Fix Probability: | | 2 | 1 | | |

Scenario 8 presents a situation where two possible fixes again present additional DTC's, beyond that output by the system onboard computer. Again, the most likely fix is identified as the fix having the same DTC's as output from the system onboard computer, without any additional DTC's, i.e., Fix 3. Again, this is notwithstanding the higher successful diagnosis count associated with fixes having additional DTC's.

| Scenario 8 | | | | | |
|---|---|---|---|---|---|
| | Fix 1 | Fix 2 | Fix 3 | Fix 4 | Fix 5 |
| P.C. | P0101 | P0101 | P0101 | P0101 | |
| S.C.(S) | P0102 | P0102 | P0102 | P0102 | |
| | P0103 | P0103 | | | |
| | P0104 | P0104 | | | |
| Count: | | 1000 | 500 | 2 | |
| Fix Probability: | | 2 | 3 | 1 | |

Scenario 9 presents a situation where three possible fixes are identified, each exactly conforming with the DTC output from the system onboard computer, and each having the same successful diagnosis count associated therewith. Under such circumstances the most likely fix is chosen as the fix having the highest associated fix cost, i.e., Fix 1. In such a way, the user is focused on the highest potential fix cost as a basis to evaluate otherwise equally probable fixes.

| Scenario 9 | | | | | |
|---|---|---|---|---|---|
| | Fix 1 | Fix 2 | Fix 3 | Fix 4 | Fix 5 |
| P.C. | P0101 | P0101 | P0101 | P0101 | |
| S.C.(s) | | | | | |
| Count: | | 50 | 50 | 50 | |

-continued

| Scenario 9 | | | | | |
|---|---|---|---|---|---|
| | Fix 1 | Fix 2 | Fix 3 | Fix 4 | Fix 5 |
| Fix Cost: | $500 | $300 | $150 | | |
| Fix Probability: | 1 | 2 | 3 | | |

Scenario 10 presents a situation where each of the possible fixes includes only a single DTC corresponding to DTC's generated by the system onboard computer, and wherein the successful diagnosis count of each possible fix is the same. Under those circumstances the most likely fix is identified as that having the highest associated cost of the three possible fixes, i.e., Fix 2.

| Scenario 10 | | | | | | |
|---|---|---|---|---|---|---|
| | | Fix 1 | Fix 2 | Fix 3 | Fix 4 | Fix 5 |
| P.C. | | P0101 | P0101 | P0101 | P0101 | |
| S.C.(S) | | P0102 | P0105 | P0115 | P0300 | |
| | | P0103 | P0108 | P0108 | P0301 | |
| | | P0104 | P0110 | P0200 | P0302 | |
| Count: | | | 500 | 500 | 500 | |
| Cost: | | | $225 | $300 | $150 | |
| Fix Probability: | | | 2 | 1 | 3 | |

Scenario 11 presents a situation where each of the three possible fixes again correlate to only one of the DTC's generated by the system onboard computer, and wherein each fix has three additional DTC's that do not find correspondence with the DTC's generated by the system onboard computer. Under those circumstances the most likely fix is identified as the fix having the highest successful fix count of the three possible fixes, i.e., Fix 1.

| Scenario 11 | | | | | | |
|---|---|---|---|---|---|---|
| | | Fix 1 | Fix 2 | Fix 3 | Fix 4 | Fix 5 |
| P.C. | | P0101 | P0101 | P0101 | P0101 | |
| S.C.(s) | | P0102 | P0105 | P0115 | P0300 | |
| | | P0103 | P0108 | P0108 | P0301 | |
| | | P0104 | P0110 | P0200 | P0302 | |
| Count: | | | 1000 | 500 | 2 | |
| Fix Probability: | | | 1 | 2 | 3 | |

As will be apparent to those of ordinary skill in the art, the techniques described above for identifying the most likely fix of the various possible fixes may be modified in accordance with user preference, without departing from the broader aspects of the present invention. For example, ranking of potential fixes by fix cost may be based on prioritizing the lowest fix cost, rather than the highest fix cost, or the presence of additional DTC's may be prioritized differently. Rankings may also be ordered on the basis of other factors, e.g., on the basis of successful fix count, or listed alphabetically.

As it will be apparent to one of ordinary skill in the art, the present invention provides a process for diagnosis and repair of home electronic devices. Moreover, the process, in the hand of consumers, provides a diagnosis that can be communicated to a repair service to facilitate proper repair and serve as a benchmark for repair costs.

Various other features may be used in combination with the invention described herein. For example, databases may include approximate cost information and/or providing contact information for suitable repair shops.

In some cases, the diagnostic process may be supplemented to include accessing and evaluating real time data derived from various circuits within the home electronic device. The use of such information to further diagnosis any defects or to identify appropriate repair procedures is predicated upon the sophistication of the home electronic device and the available user interface.

These and other enhancements and upgrades are anticipated to be useable in combination with the process described herein, without departing from the scope and spirit of the present invention as disclosed and claimed.

What is claimed is:

1. A method of processing diagnostic data from a defective home electronic device to identify the most likely fix associated with the diagnostic data, the process comprising:
   receiving at a hand held scan tool a combined set of diagnostic data downloaded from an electronic control unit disposed within the device; and
   generating, on a diagnostics assessment system independent of the hand held scan tool, a prioritized set of possible fix(es) in accordance with ranked matching, by a prioritizer, of the downloaded combined set of diagnostic data to combined sets of diagnostic data stored in a prior experience database, the prior experience database having at least one possible fix associated with each combined set of stored diagnostic data, the possible fix associated with the highest ranked set of stored diagnostic data being identified as the most likely fix among the prioritized set of possible fix(es).

2. The process as recited in claim 1 wherein the step of generating the prioritized set of possible fix(es) further comprises the step of identifying the stored set of diagnostic trouble codes having the greatest number of the diagnostic trouble codes that correspond to the set of diagnostic trouble codes downloaded from the device electronic control unit, and identifying the stored set of diagnostic trouble codes having the least number of diagnostic trouble codes that do not correspond to the set of diagnostic trouble codes downloaded from the system computer.

3. The process as recited in claim 2 wherein the step of generating the prioritized set of possible fix(es) further comprises the step of identifying the stored set of diagnostic trouble codes having the highest successful fix count associated therewith.

4. The process as recited in claim 3 wherein the step of generating the prioritized set of possible fix(es) further comprises the step of ranking the stored set of diagnostic trouble codes having the lowest cost of repair associated therewith.

5. The process as recited in claim 1 further comprising the steps of:
   i. accessing repair procedures database for repairing a range of defective conditions;
   ii. linking the most likely fix(es) to a selected repair procedure(s) in the repair procedures database, the selected repair procedure(s) being effective to implement the most likely fix(es); and
   iii. accessing the selected repair procedure(s) effective to implement the most likely fix(es).

6. The process as set forth in claim 5 comprising the step of communicating information concerning the most likely fix(es) and the associated repair procedure to the scan tool.

7. The process as recited in claim 1 further comprising the step of communicating the downloaded set of diagnostic data from a hand held scan tool to a personal computer, wherein the personal computer is a part of the diagnostics assessment system, and then communicating the downloaded set of diagnostic data from the personal computer to the prior experience database for prioritizing possible fix(es).

8. The process as recited in claim 1 further comprising the steps of:
communicating the downloaded set of diagnostic data from the scan tool to a personal computer, wherein the personal computer is a part of the diagnostics assessment system; and
communicating the downloaded set of diagnostic data from the personal computer to the prior experience database.

9. The process as recited in claim 8 wherein the step of communicating the downloaded set of diagnostic data from the scan tool to the personal computer comprises wirelessly communicating the downloaded set of diagnostic data from the scan tool to the personal computer.

10. The process as recited in claim 1 wherein the diagnostic data is wirelessly downloaded from the home electronic device to the scan tool.

11. The process as recited in claim 1 further comprising the steps of:
wirelessly communicating the downloaded set of diagnostic data from the scan tool to a cellphone, wherein the cellphone is a part of the diagnostics assessment system; and
wirelessly communicating the downloaded set of diagnostic data from the cellphone to the prior experience database.

12. The process as recited in claim 1 wherein the downloaded set of diagnostic data includes information identifying operating characteristics of the home electronic device.

\* \* \* \* \*